United States Patent [19]
Fujita et al.

[11] Patent Number: 5,296,991
[45] Date of Patent: Mar. 22, 1994

[54] MAGNETIC HEAD

[75] Inventors: Masayoshi Fujita; Toshimitsu Takano; Masahiko Yamazaki, all of Miyagi, Japan

[73] Assignee: Sony Corporation, Japan

[21] Appl. No.: 848,528

[22] Filed: Mar. 9, 1992

[30] Foreign Application Priority Data

Mar. 13, 1991 [JP] Japan .................................. 3-072196

[51] Int. Cl.⁵ ...................... G11B 5/29; G11B 5/265; G11B 5/48
[52] U.S. Cl. .................................. 360/121; 360/104
[58] Field of Search ............... 360/121, 128, 122, 125, 360/123, 126, 104, 103

[56] References Cited

U.S. PATENT DOCUMENTS

| | | | |
|---|---|---|---|
| 4,118,747 | 10/1978 | Hanaoka et al. | 360/125 |
| 4,750,071 | 6/1988 | Kato et al. | 360/121 |
| 5,005,097 | 4/1991 | Matsuoka | 360/121 |
| 5,148,342 | 9/1992 | Kato | 360/121 |
| 5,151,837 | 9/9192 | Wakasugi et al. | 360/128 |

FOREIGN PATENT DOCUMENTS

| | | | |
|---|---|---|---|
| 140616 | 8/1984 | Japan | 360/126 |
| 261009 | 12/1985 | Japan | 360/122 |
| 1096501 | 5/1986 | Japan | 360/104 |
| 1211310 | 8/1989 | Japan | 360/121 |
| 2-73565 | 3/1990 | Japan | 360/104 |

Primary Examiner—A. J. Heinz
Assistant Examiner—Allen Cao
Attorney, Agent, or Firm—Ronald P. Kananen

[57] ABSTRACT

A magnetic head having a recording and/or reproducing magnetic gap and an erasing magnetic gap for writing and/or reading informational signals on and/or from a flexible disk is disclosed. A magnetic circuit comprises a front core having center cores and side cores and a rear core. The front core is sandwiched between a pair of sliders for assuring contact with the flexible disk. At least one of the sliders is provided with core reinforcing portions in positions corresponding to the cores and the side cores of the front core. The core reinforcing portions are in contact with the center cores and the side cores for reinforcing these cores.

9 Claims, 5 Drawing Sheets

MAGNETIC HEAD

BACKGROUND OF THE INVENTION

The present invention relates to a magnetic head which is preferred for recording and/or reproducing informational signals on and/or from a floppy disk.

A magnetic head for recording and/or reproducing informational signals on and/or from a floppy disk having a magnetic head element sandwiched between a pair of sliders in which a magnetic circuit comprises a front core 51 which is formed with a recording and reproducing magnetic gap $G_1$ and an erasing magnetic gap $G_2$, a rear core 52 which is substantially E-shaped in plan and is magnetically coupled with the front core 51 to form a closed magnetic path and a pair of coil bobbins on which driving coils 53 and 54 are wound has heretofore been proposed (see FIG. 8).

In this prior art magnetic head, the front core 51 comprises a pair of bar-like center cores 59 and 60 which are integrally bonded together and a pair of L-shaped side cores 61 and 62 which sandwich the pair of center cores 59 and 60 therebetween so that a recording and reproducing magnetic gap $G_1$ and an erasing magnetic gap $G_2$ are formed between the center cores and the side cores. The rear core 52 is formed into a shape corresponding to that of the front core 51 and comprises center legs 63 and 64 and side legs 65 and 66 in such positions they face to the center cores 59 and 60 and the side cores 61 and 62 of the front core 51, respectively. The front and rear cores 51 and 52 have the facing side cores 61 and 62 and the side legs 65 and 66 which are inserted into the coil bobbins 55 and 56 in such a manner that they are stepwise overlapped and magnetically and mechanically coupled together by a simultaneously inserted leaf spring and the like.

The center cores 59 and 60 and the side cores 61 and 62 of the front core 51 are as very thin as about 0.3 mm in thickness to achieve miniaturization of the floppy disk. Accordingly, the center cores 59 and 60 and the side cores 61 and 62 may be easily damaged when they are installed on the coil bobbins 55 and 56 or secured to the rear core 52.

Since the mechanical strength of the side cores 61 and 62 is low, contact of the side cores 61 and 62 with the rear core 52 is not stable and a space may be easily formed in the bonding interface therebetween. Stabilization of the electromagnetic conversion characteristics can not be achieved with this prior art magnetic head. Further, since the sliders 57 and 58 which are provided for assuring the characteristics of the contact of the front core 51 with the floppy disk should be provided with escapements 67 and 68 for the coil bobbins 53 and 54, respectively, the bonding sides 57a and 58a for supporting the front core 51 becomes so small that a bonding strength sufficient to secure the front core 51 can not be assured. This may cause cracking in the bonding portion between the front core 51 and the sliders 57 and 58 when a groove is formed on the sliders 57 and 58 after assembly of the head components.

OBJECT AND SUMMARY OF THE INVENTION

It is an object of the present invention to provide a magnetic head in which the mechanical strength of the center cores and the side cores of a front core is enhanced.

It is another object of the present invention to provide a magnetic head in which the center cores and the side cores are prevented from being damaged for achieving a remarkable enhancement in yield.

It is a further object of the present invention to provide a highly reliable magnetic head in which enhancement in the strength of bonding between the front core and the sliders can be expected.

In order to accomplish the above mentioned object of the present invention, there is provided a magnetic head, comprising: a front core including a pair of side cores and center cores which are interposed between the pair of side cores so that first and second magnetic gaps are formed between the side cores and the center cores; a rear core having a center leg and side legs which face the center cores and the side cores of the front core; coil bobbins into which the side cores and the side legs of the front and rear cores are adapted; and a pair of sliders which sandwich the front core therebetween; at least one of the sliders being provided with core reinforcing portions which contact with the center cores and/or the side cores of the front core for reinforcing the same.

Since, in the magnetic head of the present invention, the sliders which sandwich the front cores therebetween are provided with core reinforcing portions which contact with the center cores and/or the side cores of the front core, the mechanical strength of the center cores and the side cores is enhanced by these core reinforcing portions.

Accordingly, the magnetic coupling between the front and rear cores can be made positive. Stabilization and enhancement of the electromagnetic conversion characteristics can be achieved.

Handling of parts during assembling is easy and damages of the front cores due to wrong handling during assembling of parts can be prevented. Remarkable enhancement in yield can be expected.

DESCRIPTION OF THE PREFERRED EMBODIMENTS

Figure 1:
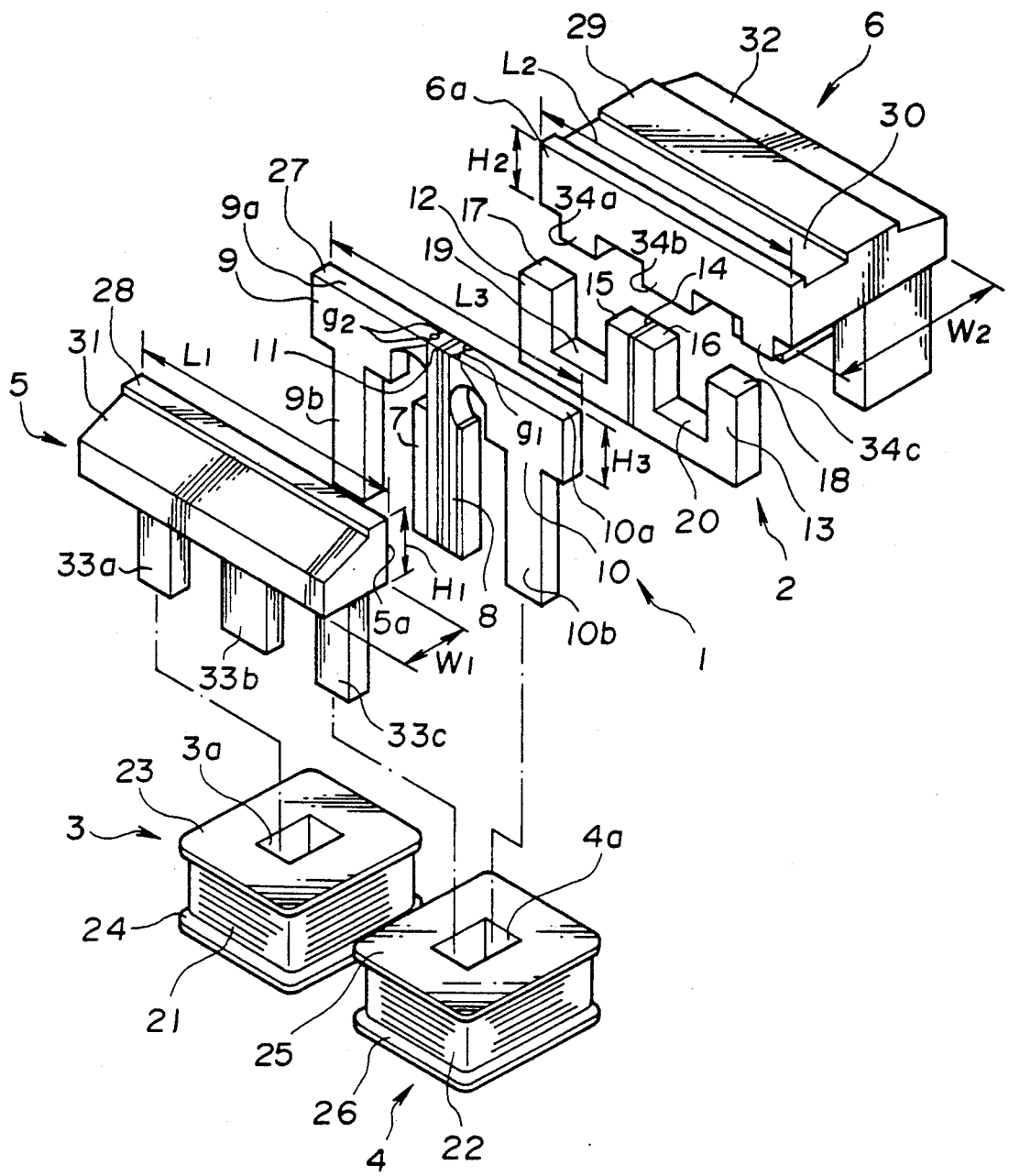
FIG. 1 is an exploded perspective view showing an embodiment of a magnetic head of the present invention.

Embodiments of the present invention will be described with reference to the drawings. The present embodiment is a magnetic head for recording and/or reproducing informational signals on and/or from a floppy disk.

The magnetic head of the present embodiment comprises a magnetic head element in which a magnetic circuit includes a front core 1, a rear core 2, and coil bobbing 3 and 4 on which driver coils are wound; and a pair of sliders 5 and 6 for assuming contact with a floppy disk (not shown).

The front core 1 comprises a pair of bar-like center cores 7 and 8 and a pair of side cores 9 and 10 which are substantially L-shaped. The center cores 7 and 8 are formed of a magnetic material such as ferrite and on the surfaces thereof facing to the side cores 9 and 10 have track width restricting grooves for restricting the track widths of the first and second magnetic gaps $g_1$ and $g_2$, respectively, which will be described hereinafter. The side cores 9 and 10 are formed of a magnetic material such as ferrite and have front portions 9a and 10a which face to the center cores 7 and 8 so that the first and second gaps $g_1$ and $g_2$ are formed therebetween and coil winding legs 9b and 10b which are disposed substantially perpendicular to the front portions 9a and 10a, respectively. The front portions 9a and 10a are provided with track width restricting grooves which are identical with those provided in the center cores 7 and 8. The coil winding legs 9b and 10b are integrally formed with the front portions 9a and 10a as flat thin plates and are inserted into core through-holes 3a and 4a of the coil bobbins 3 and 4, respectively.

In order to prevent the center cores 7, 8 and the side cores 9 and 10 from being magnetically interfered with each other, the center cores 7 and 8 are bonded together so that a non-magnetic material 11 is interposed therebetween and on the sides thereof, the side cores 9 and 10 are integrally bonded together by glass fusing, etc. The second magnetic gap $g_2$ serving as an erasing magnetic gap is thus formed between the facing surfaces of the center core 7 and the side core 9, and the first magnetic gap $g_1$ serving as a recording and/or reproducing magnetic gap is formed between the facing surfaces of the center core 8 and the side core 10.

The rear core 2 comprises a pair of core members 12 and 13 which correspond to the shape of the front core 1 and are integrally bonded together on the side thereof so that a nonmagnetic member 14 is sandwiched therebetween. The core members 12 and 13 have center legs 15 and 16 and side legs 17 and 18 in positions corresponding to the center cores 7 and 8 and the side cores 9 and 10 of the front core 1, which are linked with linking members 19 and 20 respectively. The core members 12 and 13 are substantially $\pi$-shaped in elevation. Accordingly, provision of the center legs 15 and 16 and the side legs 17 and 18 makes it possible to assure the bonding area between the cores themselves to extend the length of the front core 1 in depth direction so that electromagnetic conversion characteristics can be enhanced.

The coil bobbins 3 and 4 each comprises a coil winding portion on which driving coils 21 and 22 are wound and which is rectangular parallelepiped in shape. A pair of coil restricting members 23 and 24 or 25 and 26 are provided for restricting the position of the driving coils 21 and 22 wound on the coil winding portion in a height position. The coil restricting members 23 and 24 or 25 and 26 overhang in an outer radial direction from the outer periphery of the coil winding portion and restrict the drive coils 21 and 22 wound around the coil winding portion in a height direction with the overhang portion, respectively. The coil bobbin 3 and 4 are formed with core through-holes 3a and 4a through which side cores 9 and 10 of the front core 1 and the side legs 17 and 18 of the rear core 2 are inserted, respectively. In other words, the coil winding legs 9b and 10b of the side cores 9 and 10 and the side legs 17 and 18 of the rear core 2 are inserted into core through-holes 3a and 4a. Core reinforcing portions provided on the opposite ends of one slider 5 which will be described hereinafter are inserted into the core through-holes 3a and 4a.

Figure 2:
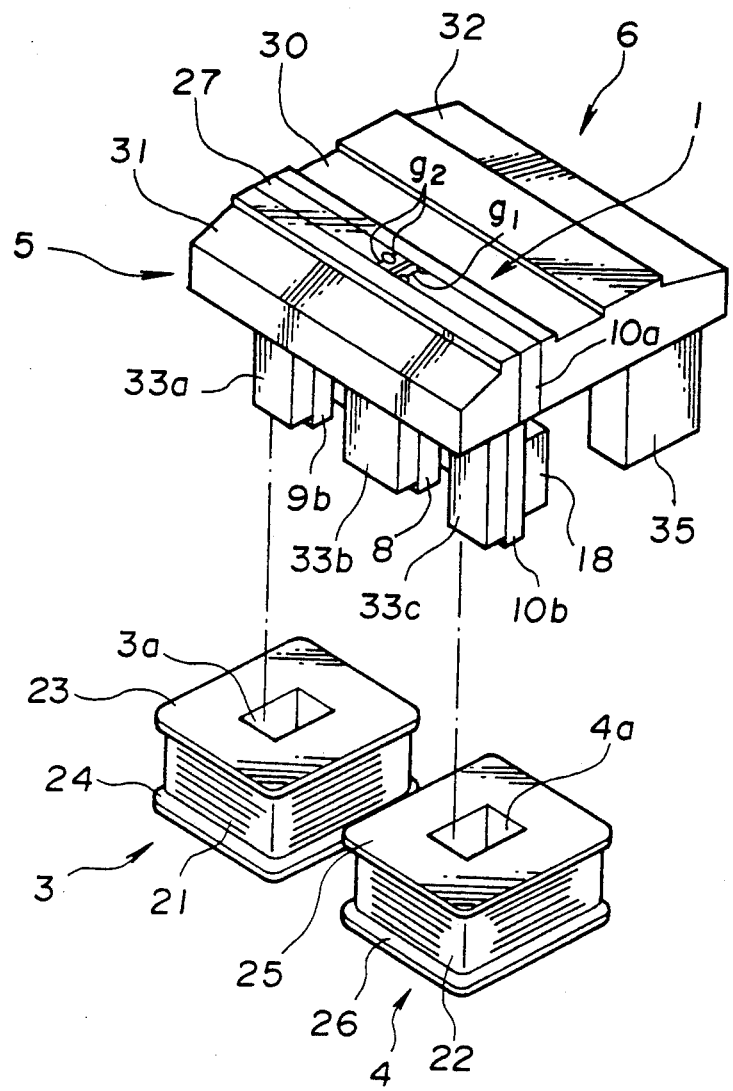
FIG. 2 is a perspective view showing the condition in which a front core, a rear core and sliders have been assembled.
Figure 3:
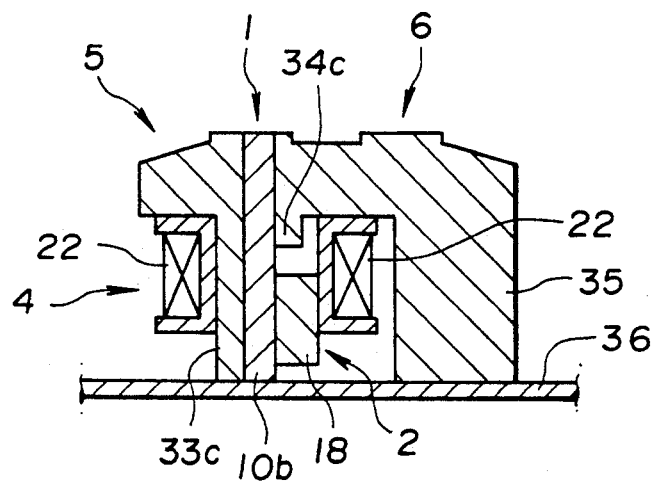
FIG. 3 is a sectional view showing the condition in which the magnetic head of FIG. 1 has been assembled.

A pair of sliders 5 and 6 are provided on the opposite sides of the front core 1 for assuring excellent contact characteristics of the head with a floppy disk and sandwich the front core 1 therebetween in a thickness direction. The sliders 5 and 6 are formed into a rectangular parallelepiped block so that lengths $L_1$ and $L_2$ in a longitudinal direction of a magnetic recording medium sliding surface of the front core on which magnetic gaps $g_1$ and $g_2$ are exposed are substantially the same as the length $L_3$ of the front core 1 and the heights $H_1$ and $H_2$ of the magnetic gaps $g_1$ and $g_2$ in a depth direction are substantially the same as the height $H_3$ from the base ends of the coil winding legs 9b and 10b to the magnetic recording medium sliding surface 27. The slider widths $W_1$ and $W_2$ of the sliders 5 and 6 in the magnetic gap $g_1$ and $g_2$ direction are such that sufficient contact of the head with the floppy disk is assured. The slider width $W_2$ of the slider 6 which is on the right side of FIG. 2 is wider than the slider width $W_1$ of the other slider 5.

The sliders 5 and 6 are formed on the surfaces 28 and 29 thereof flush with the magnetic recording medium sliding surface 27 of the front core 1 with an inclined surface 31 and an air admitting recess 30 and an inclined surface 32 for enhancing the contact characteristics of the head with the floppy disk, respectively. The surfaces 5a and 6a of the sliders 5 and 6 facing to the front core 1 will contact with the upper side edge of the front portions 9a and 10a and the center cores 7 and 8 of the front core 1 respectively and will be bonded to the front core 1 when the sliders 5 and 6 sandwich the front core 1 therebetween.

The sliders 5 and 6 in the present embodiment are provided with core reinforcing portions 33a, 33b, 33c and 34a, 34b, 34c for reinforcing the coil winding legs 9b and 10b and the center cores 7 and 8 of the front core 1, respectively. The core reinforcing portions 33a, 34a; 33b, 34b; and 33c and 34c are provided in positions corresponding to the coil winding portion 9b; the center cores 7 and 8; and the coil winding portion 10b, respectively, and depend from the side edges of the surfaces 5a and 6a facing to the front core 1 toward the coil bobbins 3 and 4, respectively.

The core reinforcing portions 33a, 33b and 33c are flat plates which are substantially identical with those of the coil winding leg 9b, the integrally bonded center core 7 and 8 and the coil winding leg 10b in shape and length in a depth direction. The coil reinforcing portions 33a, 33b and 33c are in surface contact with the coil winding leg 9b, the center core 7 and 8 and the coil winding leg 10b, respectively, and are inserted into the core through-holes 3a and 4a of the coil bobbins 3 and 4, respectively, excepting the core reinforcing portion 33b. In contrast to this, the core reinforcing portions 34a, 34b and 34c have lengths in a depth direction which are shorter than those of the core reinforcing portions 33a, 33b and 33c and support only the base ends of the coil winding leg 9b, the center cores 7 and 8, the coil winding leg 10b and portions in the vicinity thereof, respectively. Similarly, the core reinforcing portions 34a, 34b and 34c are also in surface contact with the coil winding leg 9b, the center cores 7 and 8 and the coil winding leg 10b, respectively, and the reinforcing portions 34a and 34c are inserted into core through-holes 3a and 4a of the coil bobbins 3 and 4, respectively.

The other slider 6 is provided with a plurality of support legs 35 which will become a fixing portion when a magnetic head which is completed by incorporating the front core 1, the rear core 2, the coil bobbins, etc. is secured to a ginbal 36. The support legs 35 are formed so large that they can stably fix the magnetic head relative to the ginbal 36 and are formed integrally with the slider 6 on the opposite side of the core reinforcing portions 34a, 34b and 34c.

The front core 1 and the rear core 2 are superposed on each other in such a manner that the coil winding legs 9b and 10b of the front core 1 contact with the side legs 17 and 18 of the rear core 2 in the through-holes 3a and 4a of the coil bobbins 3 and 4, respectively. In other words, one coil winding leg 9b is in contact with the corresponding side leg 17 and the coil winding leg 10b contacts with the corresponding side leg 18 so that they are magnetically coupled with each other to form a closed magnetic path. Accordingly, a magnetic head element having the first magnetic gap $g_1$ functioning as a recording and/or reproducing magnetic gap, i.e. a recording and/or reproducing head and a magnetic head element having the second magnetic gap $g_2$ functioning as an erasing magnetic gap, i.e. and erasing head are formed by the front and rear cores 1 and 2 and coil bobbins 3 and 4 on which driving coils 21 and 22 are wound.

In addition the core reinforcing portions 33a, 33c and 34a, 34c provided on the sliders 5 and 6 are inserted into the through-holes 3a and 4a of the coil bobbins 3 and 4, respectively together with coil winding legs 9b and 10b and the side legs 17 and 18. The core reinforcing portions 33a and 33c provided on the slider 5 are inserted into the core through holes 3a and 4a while they are in surface contact with the coil winding legs 9b and 10b facing thereto for increasing the mechanical strength of each of the coil winding legs 9b and 10b. The core reinforcing portions 33a and 33c have sides opposite to the sides facing to the coil winding legs 9b and 10b which are in contact with the inner walls of the core through-holes 3a and 4a, respectively to provide positive magnetic and mechanical coupling between the front core 1 and the rear core 2. Accordingly, a spacing which may cause the deterioration of the electromagnetic conversion characteristics will not be formed between the coil winding legs 9b, 10b and the side legs 17 and 18. Similarly, the core reinforcing portions 34a and 34b are inserted into the core through-holes 3a and 4a for increasing the mechanical strength of the base end portion of the coil winding legs 9b and 10b while they are in surface contact with the coil winding legs 9b and 10b facing thereto.

The front core 1 and the sliders 5 and 6 are partially bonded to each other for preventing the deterioration of the magnetic characteristics of the core material of the front core 1 and the deterioration of the electromagnetic converting characteristics of the head. For clarity of illustration, the bonded portions between the front core 1 and the sliders 5 and 6 are represented by large solid lines in FIGS. 3 to 7 of the present embodiment.

The above-mentioned magnetic head is manufactured as follows:

First, the sliders 5 and 6 are integrally bonded to the front core 1. Prior to bonding of the sliders 5 and 6 to the front core 1, the core reinforcing portions 33a, 33b, 33c and 34a, 34b and 34c provided on the sliders 5 and 6 are positioned relative to the coil winding leg 9b, the center cores 7 and 8 and the coil winding leg 10b and thereafter bonded to each other, respectively.

Then, the integrally bonded coil winding legs 9b and 10b and the core reinforcing portions 33a, 33c and 34a, 34c are inserted into coil bobbins 3 and 4, respectively. Since coil winding legs 9b and 10b are integrally bonded to the coil winding legs 33a and 34a and 33c and 34c respectively, and are mechanically reinforced when they are inserted into the coil bobbins 3 and 4, the coil winding legs 9b and 10b will not be damaged due to unwanted contact of the coil bobbins 3 and 4 with the coil winding legs 9b and 10b, respectively. Accordingly, handling of the parts is easy so that automatic assembling by a labor saving machine such as robot may be achieved to gain a remarkable increase in productivity.

Subsequently, the side legs 17 and 18 of the rear core 2 are inserted into the coil bobbins 3 and 4, respectively, from an end thereof opposite to the end to which the front core 1 was inserted. At this time, the side legs 17 and 18 are inserted so that they are brought into contact with the coil winding legs 9b and 10b and are overlapped thereon.

As a result of this, the front core 1 is mechanically and magnetically coupled to the rear core 2 so that a magnetic circuit is formed by the driving coils 21 and 22 disposed therearound.

The finished magnetic head is mounted on the ginbal 36 in position and bonded thereto with bonding agent and the like.

Although an embodiment of the magnetic head of the present invention has been described, various modifications are possible without being limited to the foregoing embodiment.

Although the core reinforcing portions 33a, 33b, 33c and 34a, 34b, 34c are provided on the sliders 5 and 6 so that they correspond to the coil winding leg 9b, the center cores 7 and 8 and the coil winding leg 10b of the front core 1, respectively, in the above mentioned embodiment, they may be provided only for the center cores 7 and 8 or only the coil winding leg 9b and 10b if necessary.

Figure 4:
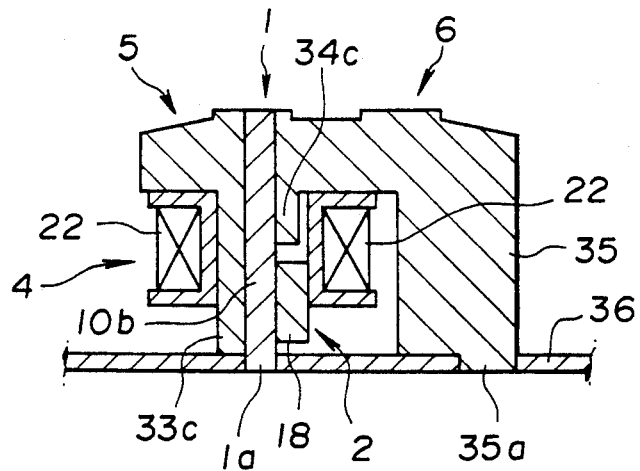
FIG. 4 is a sectional view showing another embodiment of a magnetic head of the present invention.

As shown in FIG. 4, the lengths of the core reinforcing portions 34a, 34b and 34c provided on the other slider 6 may be extended in a depth direction so far as they will not contact with the side leg 17, the center legs 15, 16 and the side leg 18 of the rear core 2 for further increasing the mechanical strength of the coil winding leg 9b and the center cores 7 and 8 and the coil winding leg 10b of the front core 1. In order to make easy positioning of the magnetic head to the ginbal 36, the length of the front core 1 and a part of the support leg 35 of the other slider 6 are slightly longer than those of the core reinforcing portions 33a, 33b and 33c provided on the slider 5. Thus, extended portions 1a and 35a of the first core 1 and support leg 35, respectively, are inserted into slits provided in the ginbal 36 for restricting the position of the front core 1 and the leg 35. In FIG. 4, large solid lines in a bonding interface between the front core 1 and the sliders 5 and 6 represent the position where a bonding agent (including glass) for bonding these components is applied.

Figure 6:
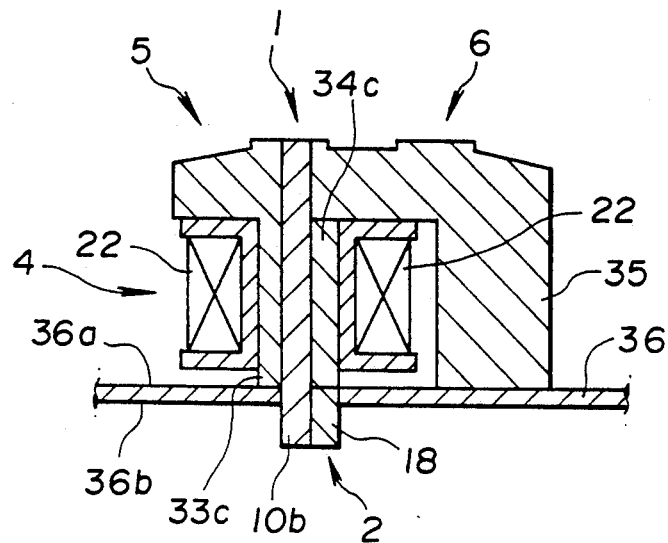
FIG. 6 is a sectional view showing a further embodiment of a magnetic head of the present invention.

In order to further increase the mechanical strength of the center cores 7 and 8, and the coil winding legs 9b and 10b of the front core 1, the length of the core reinforcing portions 34a, 34b and 34c provided on the other slider 6 may be substantially the same as those of the core reinforcing portions 33a, 33b and 33c provided on the slider 5 as shown in FIG. 6. In this case, magnetic coupling of the front core 1 to the rear core 2 can not be achieved. Therefore, the center cores 7 and 8 and the coil winding legs 9b and 10b of the front core 1 may be extended so that magnetic coupling of the front core 1 to the rear core 2 is achieved on the side 36b of the ginbal 36 opposite to the head mounted side 36a. Large solid lines in the bonding interface between the front core 1 and the sliders 5 and 6 in FIG. 6 represent the positions where bonding agent (including glass) is applied.

Figure 5:
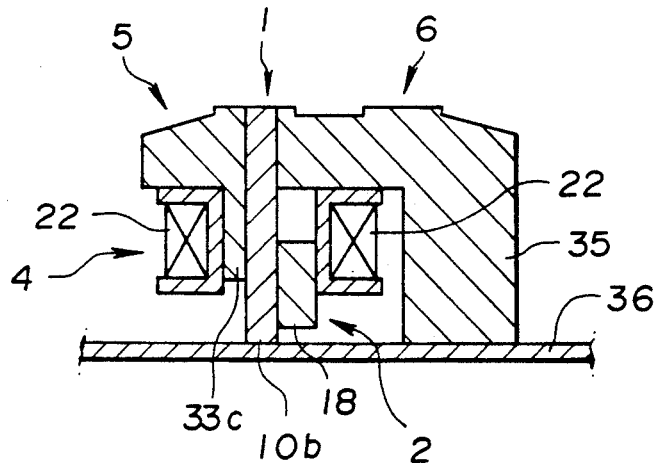
FIG. 5 is a sectional view showing a further embodiment of a magnetic head of the present invention.

Alternatively, the core reinforcing portions 34a, 34b and 34c provided on the other slider 6 may be omitted and the center cores 7 and 8 and the coil winding legs 9b and 10b of the front core 1 may be reinforced by only the core reinforcing portions 33a, 33b and 33c provided on the other slider 5, as shown in FIG. 5. Large solid lines in the bonding interface between the front core 1 and the sliders 5 and 6 in FIG. 5 represent the positions where bonding agent (including glass) is applied.

Figure 7:
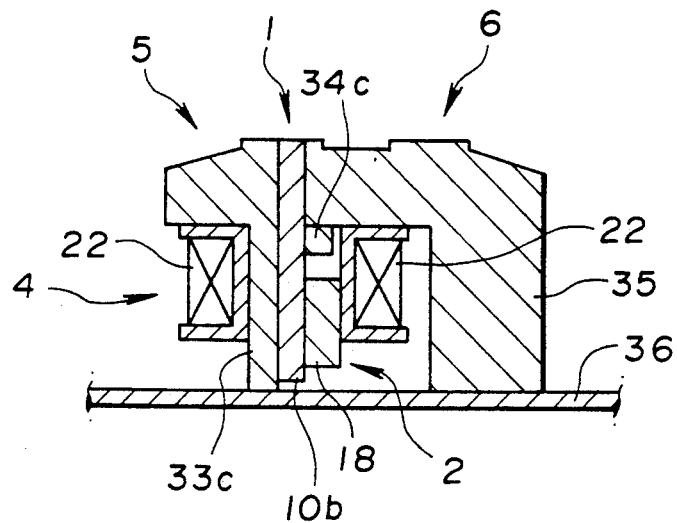
FIG. 7 is a sectional view showing a further embodiment of a magnetic head of the present invention.
Figure 8:
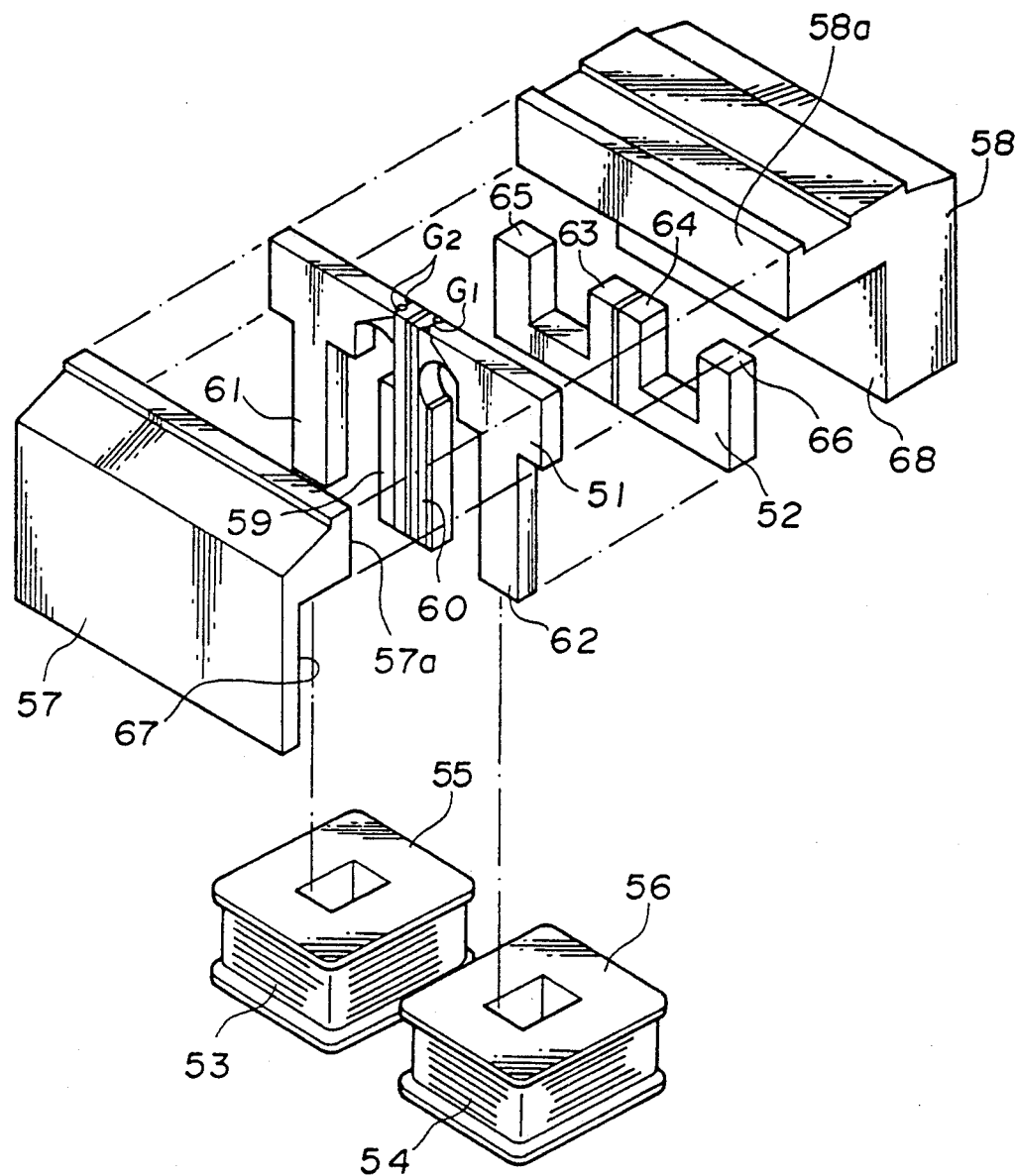
FIG. 8 is an exploded perspective view showing a prior art magnetic head.

Alternatively, the core reinforcing portions 33a, 33b and 33c provided on the slider 5 may have lengths longer than those of the center cores 7 and 8 and the coil winding legs 9b and 10b of the front core 1, as shown in FIG. 7. Large solid lines in the bonding interface between the front core 1 and the sliders 5 and 6 in FIG. 7 represent the positions where bonding agent (including glass) is applied.

What is claimed is:

1. A magnetic head, comprising:
    a front core including a pair of side cores and center cores interposed between the pair of side cores so that first and second magnetic gaps are formed between the side cores and the center cores;
    a rear core having a center leg and side legs which contact with the center cores and the side cores of the front core;
    coil bobbins having core through-holes into which the side cores and the side legs of the front and rear cores are inserted; and
    a pair of sliders which sandwich the front core therebetween;
    wherein at least one of the sliders is provided with core reinforcing portions which contact with the center cores and/or the side cores of the front core for reinforcing the same, in which the side cores of the front core and the core reinforcing portions of the sliders which contact with the side cores of the front core are positioned within the core through-holes of the coil bobbins and are in surface contact with each other.

2. A magnetic head as defined in claim 1 in which the first and second magnetic gaps are a recording and/or reproducing magnetic gap and an erasing magnetic gap, respectively.

3. A magnetic head as defined in claim 1, wherein said side cores of said front core and said side legs of said rear core are positioned within respective through-holes of said coil bobbins from opposite ends thereof.

4. A magnetic head as defined in claim 1, wherein said first slider includes a pair of core reinforcing portions each contacting a respective one of said first and second coil winding legs of the front core for reinforcing the same.

5. A magnetic head as defined in claim 1, wherein said second slider includes at least one core reinforcing portion which contacts at least one of said coil winding legs of the front core for reinforcing the same.

6. A magnetic head as defined in claim 5, wherein said second slider includes a pair of core reinforcing portions each contacting a respective one of said first and second coil winding legs of the front core for reinforcing the same.

7. A magnetic head as defined in claim 1, wherein said front core further comprises at least one center core, and said first slider includes at least one core reinforcing portion which contacts said at least one center core for reinforcing the same.

8. A magnetic head as defined in claim 7, wherein said second slider includes at least one core reinforcing portion which contacts said at least one center core for reinforcing the same.

9. A magnetic head as defined in claim 1, wherein the other one of said sliders is provided with reinforcing portions bonded to said side cores and center cores of the front core for reinforcing the same.

* * * * *